US008708621B2

(12) United States Patent
Nakajima et al.

(10) Patent No.: US 8,708,621 B2
(45) Date of Patent: Apr. 29, 2014

(54) SPIRAL FLUTED TAP AND METHOD FOR MANUFACTURING THE SAME

(75) Inventors: Takayuki Nakajima, Toyokawa (JP); Kouji Miyake, Toyokawa (JP)

(73) Assignee: OSG Corporation, Toyokawa-shi (JP)

( * ) Notice: Subject to any disclaimer, the term of this patent is extended or adjusted under 35 U.S.C. 154(b) by 309 days.

(21) Appl. No.: 13/203,392

(22) PCT Filed: Mar. 9, 2009

(86) PCT No.: PCT/JP2009/054474
§ 371 (c)(1),
(2), (4) Date: Aug. 25, 2011

(87) PCT Pub. No.: WO2010/103611
PCT Pub. Date: Sep. 16, 2010

(65) Prior Publication Data
US 2012/0134761 A1  May 31, 2012

(51) Int. Cl.
*B23G 5/06* (2006.01)
(52) U.S. Cl.
CPC ........................ *B23G 5/06* (2013.01)
USPC .............................. 408/222; 470/198; 76/115
(58) Field of Classification Search
USPC ......... 408/215, 216, 217, 218, 219, 220, 222; 470/91
IPC ........................................................ B23G 5/06
See application file for complete search history.

(56) References Cited

U.S. PATENT DOCUMENTS

| 6,345,941 B1 * | 2/2002 | Fang et al. ................ 409/74 |
| 2004/0131434 A1 * | 7/2004 | Giessler .................... 408/59 |
| 2004/0247406 A1 * | 12/2004 | Malagnino et al. ........... 408/222 |
| 2005/0042049 A1 * | 2/2005 | Schwarz .................... 408/222 |
| 2006/0216124 A1 * | 9/2006 | Oknestam et al. ............ 408/222 |
| 2009/0214311 A1 | 8/2009 | Nakajima et al. |

FOREIGN PATENT DOCUMENTS

| JP | U-62-025114 | 2/1987 |
| JP | U-06-057524 | 8/1994 |
| JP | A-08-039353 | 2/1996 |
| JP | A-10-146721 | 6/1998 |

(Continued)

OTHER PUBLICATIONS

Feb. 18, 2013 Chinese Office Action issued in Chinese Application No. 200980157931.X (with partial translation).

(Continued)

*Primary Examiner* — Andrea Wellington
*Assistant Examiner* — Alan Snyder
(74) *Attorney, Agent, or Firm* — Oliff PLC

(57) ABSTRACT

A spiral fluted tap is provided which includes a threaded portion having an external thread corresponding to an internal thread to be cut and a cutting edge formed along a spiral flute formed to divide the external thread, and being screwed into a prepared hole that is provided on a workpiece to cut an internal thread by the cutting edge on an inner circumferential surface of the prepared hole with discharging chips toward a shank via the spiral flute, the spiral flute having a stepped portion at a rear end of a chamfer portion or in a portion on a shank side from the rear end of the chamfer portion in the threaded portion, and a flute bottom diameter on a distal end side of the spiral fluted tap from the stepped portion being smaller than a flute bottom diameter on a shank side from the stepped portion.

9 Claims, 3 Drawing Sheets

(56) References Cited

FOREIGN PATENT DOCUMENTS

| | | |
|---|---|---|
| JP | A-2008-272856 | 11/2008 |
| JP | 2009255211 A * | 11/2009 |
| WO | WO 2008/136123 A1 | 11/2008 |

OTHER PUBLICATIONS

International Search Report issued in International Patent Application No. PCT/JP2009/054474 dated May 19, 2009.

* cited by examiner

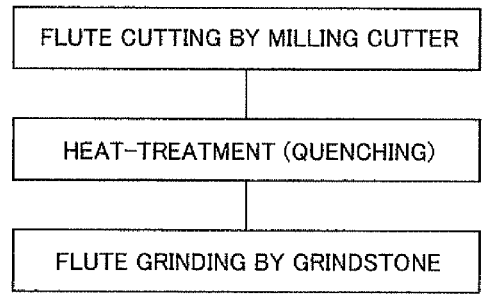

FIG.2

| TEST PIECE | SMALL-DIAMETER FLUTE LENGTH La (POSITION OF STEP) | | DIFFERENCE OF DIAMETER Δd | RESULT |
|---|---|---|---|---|
| No1 | CHAMFER LENGTH (2.5 THREADS) | 9mm | 0.3mm | CHIPS NOT CLOGGED |
| No2 | THREAD LENGTH Ls | 28mm | 0.3mm | CHIPS NOT CLOGGED |
| No3 | THREAD LENGTH Ls+1D | 58mm | 0.3mm | CHIPS NOT CLOGGED |
| No4 | THREAD LENGTH Ls+1D | 58mm | 0.5mm | CHIPS NOT CLOGGED |
| No5 | THREAD LENGTH Ls+1.5D | 73mm | 0.3mm | CHIPS CLOGGED |
| No6 | THREAD LENGTH Ls+2D | 88mm | 0.3mm | CHIPS CLOGGED (SAME AS CONVENTIONAL PRODUCTS) |
| No7 | NONE (THREAD LENGTH Ls+4.5D) | 163mm | — | CHIPS CLOGGED |

FIG.3

SPIRAL FLUTED TAP AND METHOD FOR MANUFACTURING THE SAME

TECHNICAL FIELD

The present invention relates to a spiral fluted tap, especially, to a technique to prevent that a plurality of chips discharged toward the shank side through the spiral flute are mutually entangled to be like a ball and it causes damages of the tool and the workpiece by such as clogging of chips or causes entangling, with such as the shank, of a part of the chips like a ball caught.

BACKGROUND ART

It is known a spiral fluted tap which includes (a) a threaded portion having an external thread corresponding to an internal thread to be cut and a cutting edge formed along a spiral flute formed to divide the external thread, and (b) being screwed into a prepared hole that is provided on a workpiece to cut an internal thread by the cutting edge on an inner circumferential surface of the prepared hole with discharging chips toward a shank via the spiral flute (See Patent Document 1).
Patent Document 1: JP 8-39353 A

DISCLOSURE OF THE INVENTION

Object Achieved by the Invention

However, in such a spiral fluted tap, since a plurality of chips corresponding to the number of the chamfer thread are discharged toward the shank side through the same spiral flute, for instance, when steel is tapped to form an internal thread, chips are mutually entangled in the spiral flute to be like a ball and it causes damages of the tool and the workpiece by such as clogging of chips or biting of chips or causes entangling, with such as the shank, of a part of the chips like a ball caught in the spiral flute by extending from the spiral flute. Accordingly, today workers must always monitor and remove chips if necessary and it prevents full automation (labor-saving process) of contiguous tapping of a plenty of thread holes (internal threads).

It is therefore an object of the present invention to provide a spiral fluted tap to achieve a technique to restrain that a plurality of chips discharged toward the shank through the same spiral flute are mutually entangled and it causes damages of the tool and the workpiece by clogging of chips or biting of chips or causes entangling, with such as the shank, of chips.

Means for Solving the Problem

The object indicated above may be achieved according to the first aspect of the invention, which provides a spiral fluted tap which includes (a) a threaded portion having an external thread corresponding to an internal thread to be cut and a cutting edge formed along a spiral flute formed to divide the external thread, and (b) being screwed into a prepared hole that is provided on a workpiece to cut an internal thread by the cutting edge on an inner circumferential surface of the prepared hole with discharging chips toward a shank via the spiral flute, is characterized in that: (c) the spiral flute has a stepped portion at a rear end of a chamfer portion or in a portion on a shank side from the rear end of the chamfer portion in the threaded portion, and a flute bottom diameter on a distal end side of the spiral fluted tap from the stepped portion is smaller than a flute bottom diameter on a shank side from the stepped portion.

The object indicated above may be achieved according to the second aspect of the invention, which provides the spiral fluted tap of the first aspect, wherein a diameter difference $\Delta d$ between the flute bottom diameters in opposite portions with respect to the stepped portion is determined to satisfy a following formula (1), $$\Delta d \geq H/(n \times m) \qquad (1)$$

where H is a height of a thread of the internal thread to be tapped, n is a number of a chamfer thread of the threaded portion and m is a number of the spiral flute.

The object indicated above may be achieved according to the third aspect of the invention, which provides the spiral fluted tap of the first or second aspect, wherein, in a parallel direction to a tool axis O, a small-diameter flute length La from a distal end of the spiral fluted tap to the stepped portion is not greater than a dimension calculated by adding an outer diameter D of the threaded portion to a thread length Ls from the distal end of the spiral fluted tap to a rear end of the threaded portion.

The object indicated above may be achieved according to the fourth aspect of the invention, which provides the spiral fluted tap of any one of the first to third aspect, wherein the flute bottom diameter is gradually and contiguously varied such that the stepped portion has a tapered shape or a concaved curvature shape in a direction parallel to the tool axis O or along the spiral flute.

The object indicated above may be achieved according to the fifth aspect of the invention, which provides the spiral fluted tap of any one of the first to fourth aspect, wherein a great-diameter flute portion disposed on the shank side from the stepped portion is a rough cut flute formed by cutting before quenched, and a small-diameter flute portion disposed on the distal end side of the spiral fluted tap from the stepped portion is a finishingly-ground flute formed by grinding after quenched.

The object indicated above may be achieved according to the sixth aspect of the invention, which provides a method for manufacturing the spiral fluted tap of the fifth aspect, is characterized by including: (a) a flute rough-cutting step for forming the rough cut flute by cutting over all length of the spiral flute; (b) a heat treatment step for hardening by quenching after the flute rough-cutting step; and (c) a flute grinding step for forming the small-diameter flute portion constituted of the finishingly-ground flute which the rough cut flute is finishingly ground, by flute grinding the rough cut flute only on the distal end side of the spiral fluted tap from the stepped portion, after the heat treatment step.

Advantages of the Invention

According to the spiral fluted tap of the present invention, the flute bottom diameters of the spiral flute on the distal end side of the tap and on the shank side from the stepped portion are different, the stepped portion being disposed at the rear end of the chamfer portion of the threaded portion or on the shank side from the rear end of the chamfer portion of the threaded portion. The flute bottom diameter on the distal end side of the tap from the stepped portion is smaller than the flute bottom diameter on the shank side from the stepped portion, and, accordingly, chips produced by the cutting edge of the chamfer portion move toward the shank through the spiral flute and reach the stepped portion and, then, are directed toward the direction apart from the flute bottom by the stepped portion and are outwardly from the spiral flute and preferably discharged. This restrains troubles that a plurality of chips are mutually entangled in the spiral flute to be like a ball and it causes damages of the tool and the workpiece by clogging of chips or biting of chips or causes entangling, with such as the shank, of a part of the chips like a ball caught in the spiral flute by extending from the spiral flute. Furthermore, thus, the performance of discharging chips is improved, and, accordingly, it is not necessary for workers to monitor entangling or clogging of chips even if a plurality of thread holes are contiguously made, to achieve full automation (labor-saving process).

According to the second aspect of the invention, the diameter difference Δd between the flute bottom diameters in opposite portions with respect to the stepped portion is determined to satisfy the above-mentioned formula (1), it is substantially greater than the thickness of a chip, and the height of a step formed in the stepped portion of the spiral flute is Δd/2, that is, a half of the diameter difference Δd and is not smaller than ½ of the thickness of a chip, and, accordingly, chips are properly directed toward the direction apart from the flute bottom by the stepped portion and are outwardly from the spiral flute and preferably discharged.

According to the third aspect of the invention, the small-diameter flute length La from the distal end of the tap to the stepped portion is not greater than a dimension calculated by adding the outer diameter D of the threaded portion to the thread length Ls, and, accordingly, before a plurality of chips are mutually entangled in the spiral flute to be like a ball, chips are properly directed toward the direction apart from the flute bottom by the stepped portion and are outwardly from the spiral flute and preferably discharged, and, thus, mutual entangling of chips in the spiral flute is preferably restrained.

According to the fourth aspect of the invention, the flute bottom diameter is gradually and contiguously varied such that the stepped portion has a tapered shape or a shape of a concaved curvature in the direction parallel to the tool axis O or along the spiral flute. And, accordingly, chips are properly directed toward the direction apart from the flute bottom along the stepped portion and are outwardly from the spiral flute and preferably discharged.

According to the fifth aspect of the invention, the great-diameter flute portion disposed on the shank side from the stepped portion is a rough cut flute formed by cutting before quenched, and the small-diameter flute portion disposed on the tap distal end side from the stepped portion is a finishingly-ground flute formed by grinding after quenched. For instance, when, as the sixth aspect of the invention, the rough cut flute is formed through cutting over all the length of the spiral flute, and only a portion of the rough cut flute on the tap distal end side from the stepped portion is ground to have the finishingly-ground flute in the flute grinding step, the cost for the flute grinding that requires remarkable labor and time is reduced, and, accordingly, the cost for manufacturing is reduced.

According to the sized aspect of the invention that is the method for manufacturing the spiral fluted tap according to the fifth aspect of the invention, the cost for the flute grinding that requires remarkable labor and time is reduced, and, accordingly, the cost for manufacturing is reduced, and, furthermore, since the fifth aspect of the invention is depended from the first to fourth aspects, the same advantages and effects as those of the first to fourth aspects can be obtained.

BRIEF DESCRIPTION OF THE DRAWINGS

FIG. 1A is a diagrammatic front view, FIG. 1B is a cross-sectional view for explaining the change in the flute bottom diameter of the spiral flute, and FIG. 1C is an enlarged cross-sectional view of a stepped portion formed in the spiral flute to be cut along the flute.

FIG. 2 illustrates steps of manufacturing the spiral flute of the spiral fluted tap of FIG. 1A to 1C.

FIG. 3 is a diagram showing the specifications of seven kinds of test pieces including those according to the present invention and the conventional product and the results of the test for discharging performance of chips performed with using the above test pieces.

NOMENCLATURE OF ELEMENTS

Figure 1A:
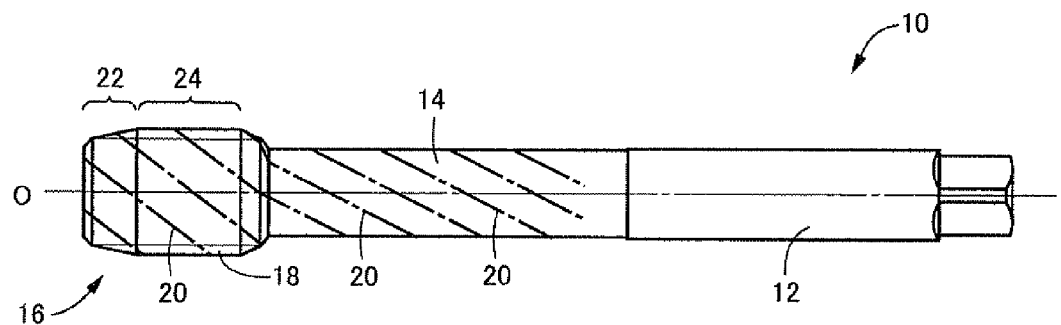
FIGS. 1A to 1C illustrate a spiral fluted tap of one embodiment according to the present invention.

10: Spiral fluted tap 12: Shank 16: Threaded portion 18: External thread 20: Spiral flute 20a: Great-diameter flute portion 20b: Small-diameter flute portion 22: Chamfer portion 30, 32, 34: Stepped portion La: Small-diameter flute length d1, d2: Flute bottom diameter D: Outer diameter of threaded portion O: Tool axis

BEST MODE FOR CARRYING OUT THE INVENTION

According to the spiral fluted tap of the present invention, chips are discharged toward the shank, and, concretely, in a case of tapping by rotatably driving the spiral fluted tap provided with the cutting edge along the clockwise-spiral flute, clockwise as viewed from the shank side, and in a case of tapping by rotatably driving the spiral fluted tap provided with the cutting edge along the counterclockwise-spiral flute, counterclockwise as viewed from the shank side. Such a spiral fluted tap is preferably used for tapping to form an internal thread in a blind hole, and, further, it can be used for tapping to form an internal thread in a through-hole. It may be applied to a tap with a drill that is integrally provided with such as a drill for forming a prepared hole in a distal end of the tap.

The above-mentioned spiral fluted tap may be made of various materials for tools, for instance, high speed tool steel (high speed steel) or cemented carbide, and it may be coated with a hard layer made of such as TiAlN, TiN or TiCN or formed with a porous oxide layer in a steam treatment for use if necessary. The spiral fluted tap may be also preferably used in a case of tapping to form an internal thread in a condition that chips tend to be comparatively tangled, such as in a case of tapping to form an internal thread with water-soluble oil-based cutting agent, MQL (Minimum Quantity Lubrication) or dry machining without oil-based cutting agent, or in a case of tapping to form an internal thread in steel. Furthermore, it can be, of course, used for wet machining to tap (to form an internal thread) with being sufficiently supplied with lubricating agent, and for tapping to form an internal thread in other workpiece than steel.

In the spiral fluted tap according to the present invention, for instance, a neck portion having a smaller diameter than that of the threaded portion between the threaded portion and the shank portion may be formed, the spiral flute may be formed contiguous with not only the threaded portion but also the neck portion, and the stepped portion may be formed on the neck portion. The stepped portion may be formed in the rear end of the chamfer portion or in a portion on the shank side therefrom, or it may be formed in the full threaded portion. Accordingly, it is applicable to a spiral fluted tap having no neck portion or a spiral fluted tap having the spiral flute only on the threaded portion. The spiral flute is formed to have the helix angle in the threaded portion in a range, for instance, from 10° to 50° for cutting performance and discharging performance of chips. The proper number of the cutting edge (equal to the number of the spiral flute) is, for instance, from two to six, although it depends on a material of the workpiece and a size of the tap.

The flute bottom diameter d1 in the great-diameter flute portion on the shank side from the stepped portion and the flute bottom diameter d2 in the small-diameter flute portion on the distal end side of the tap from the stepped portion have, respectively, a constant diameter dimension, for instance, in the tool axis direction. And, in turn, a tapered diameter dimension may be applied to the flute bottom diameter that contiguously increase or decrease in the tool axis direction.

The diameter difference Δd between the flute bottom diameters in opposite portions with respect to the stepped portion is preferable to be not smaller than H/(n×m) as shown in the above-mentioned formula (1), that is, not smaller than the thickness of the chip, otherwise, if the diameter difference Δd is smaller than H/(n×m), the effect to direct chips outward can be obtained. The small-diameter flute length La is preferable to be not greater than (Ls+1.5D), where Ls is the thread length from the distal end of the tap to the rear end of the threaded portion and D is the outer diameter of the threaded portion, and it is further preferable to be not greater than (Ls+1D). Otherwise, the performance to discharge chips can be improved, depending on working conditions of the workpiece material if it is longer than (Ls+1.5D). Irrespective of the thread length Ls, using only the outer diameter D of the threaded portion, the stepped portion may be formed in a range not greater than 2.5D, more preferably, in a range not greater than 2D. The outer diameter D of the threaded portion corresponds to the nominal diameter of the thread.

It is preferable that the flute bottom diameter is gradually and contiguously varied such that the stepped portion has a tapered shape or a concaved curvature shape in a direction parallel to the tool axis O or along the spiral flute (spiral direction) in the stepped portion. Otherwise, a step perpendicular to the tool axis O or a step perpendicular to a direction along the spiral flute may achieve the effect to discharge chips outward by properly determining a size of the step.

Such a spiral flute having the stepped portion can be preferably formed at a low cost, for instance, by forming the rough cut flute over all the length of the spiral flute before heat treatment such as in quenching, and by flute-grinding the rough cut flute on the distal end side of the tap from the stepped portion after heat treatment. Otherwise, various embodiments may be applicable, for instance, it is possible to contiguously form the small-diameter flute portion and the great-diameter flute portion by grinding using the grindstone over all the length of the spiral flute after such as heat treatment.

EMBODIMENT

Hereinafter, there will be described embodiments of the present invention by reference to the drawings.

Figure 1B:
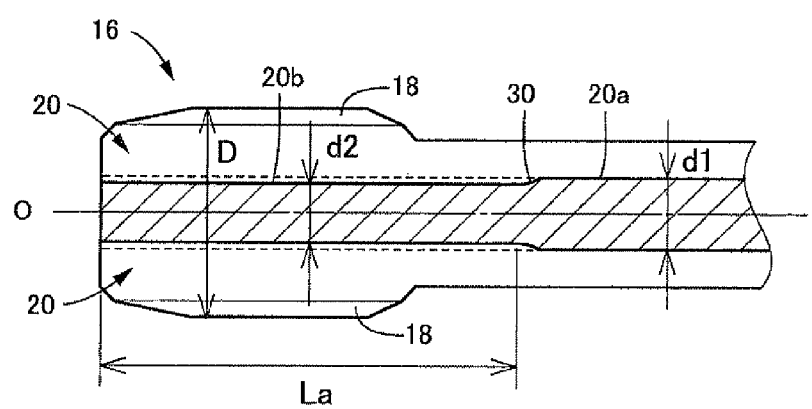
Figure 1C:
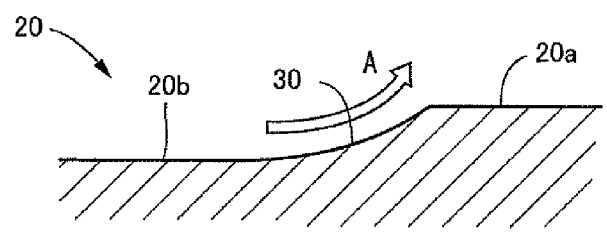

FIGS. 1A to 1C illustrates a spiral fluted tap 10 having five cutting edges of one embodiment according to the present invention, FIG. 1A is a diagrammatic front view as viewed from the perpendicular direction to the tool axis O, FIG. 1B is a cross-sectional view for an explanation of the change in the flute bottom diameter of the spiral flute, and FIG. 1C is an enlarged cross-sectional view cut along the flute, of a stepped portion formed in the spiral flute. The spiral fluted tap 10 includes a shank 12, a neck portion 14 and a threaded portion 16, which are integrally formed on the common tool axis O in such an order, and integrally made of high-speed tool steel, and a porous oxide layer is formed on a surface of the spiral fluted tap 10 by a water vapor treatment.

The threaded portion 16 has a right-hand external thread 18 formed in a groove profile corresponding to an internal thread to be cut, and five spiral flutes 20 are formed apart from each other by an equal angle about the tool axis O so as to divide the external thread 18. The threaded portion 16 includes a chamfer portion 22 formed at an axial distal end thereof with a thread of the external thread 18 removed in the axial direction in a tapered shape, and a full thread portion 24 having a constant outer diameter (nominal diameter) D and contiguous to the chamfer portion 22 and is provided with a cutting edge at a ridgeline between the threaded portion 16 and the spiral flute 20. The spiral flute 20 is a right-hand helix. In use, the spiral fluted tap 10 is rotatably driven clockwise as viewed from the shank 12 so that a distal end of the threaded portion 16 is screwed into the prepared hole of the workpiece (not shown). Thus, the right-hand internal thread is cut by the cutting edge on an inner circumferential surface of the prepared hole with the spiral flute 20 permitting chips to be discharged toward the shank 12. In the present embodiment, the nominal designation of the threaded portion 16 is M30× 3.5, the outer diameter D is 30 mm, the pitch P of the external thread 18 is 3.5 mm, the axial length (thread length) Ls from the distal end of the tap to the rear end of the threaded portion 16, that is, to the rear end of the full thread portion 24 is about 28 mm, and the number of the thread of the chamfer portion 22 (the number of chamfer thread) n is 2.5 (about 9 mm). In FIG. 1A, the external appearance of the spiral fluted tap 10 is diagrammatically illustrated, for instance, the spiral flute 20 is represented by an alternate long and short dash straight line. All the proportions of the dimensions and the angles may not be reflective of the real ones in the drawings.

The spiral flute 20 is contiguously formed on substantially all over the neck portion 14 beyond the threaded portion 16. The spiral flute 20 is formed with a constant lead (125 mm in the embodiment), and the helix angle α in the threaded portion 16 is about 37°. The spiral flute 20 has a stepped portion 30 at the rear end of the chamfer portion 22 or at a portion nearer to the shank 12 in the threaded portion 16, and the flute bottom diameter d2 on the distal end side of the tap from the stepped portion 30 is smaller than the flute bottom diameter d1 on the shank 12 side from the stepped portion 30. That is, the spiral flute 20 is constituted of a great-diameter flute portion 20a having the flute bottom diameter d1 on the shank 12 side from the stepped portion 30, and a small-diameter flute portion 20b having the flute bottom diameter d2 on the distal end side of the tap from the stepped portion 30. The small-diameter flute length La that is an axial length (a length dimension in a perpendicular direction to the tool axis O) of the small-diameter flute portion 20b is not greater than a dimension (Ls+1D) calculated by adding the outer diameter D of the threaded portion 16 to the thread length Ls, and the stepped portion 30 is formed in a range of Ls≤La≤Ls+1D in the present embodiment. FIG. 1B is a cross-sectional view for an explanation of a change in the flute bottom diameters d1 and d2, and it is illustrated by cutting in a central portion of the flute bottom of optional two spiral flutes 20 about the tool axis O, and the spiral flute 20 is shown as parallel to the tool axis O.

The diameter difference Δd (=d1−d2) between the flute bottom diameters adjacent to the above-mentioned stepped portion 30 is determined to satisfy the following formula (1)

by using a height H of the thread of the internal thread to be tapped, a number n of the chamfer thread of the threaded portion 16, and a number m of the spiral flute 20. The height H of the thread is 0.541266×P calculated by the standard dimension calculation formula of "meter coarse pitch thread" defined in JIS (Japan Industrial Standard) B0205, and H=0.541266×3.5=1.89443 mm in the present embodiment. Since, for the number n of the chamfer thread, n=2.5 and, for the number m of the spiral flute 20, m=5, H/(n×m)=1.89443/(2.5×5) is approximately equal to 0.152, and the diameter difference Δd is set as not smaller than 0.152, the stepped portion 30 is formed with Δd=0.3 mm, that is, about twice, in the present embodiment. This diameter difference Δd is twice a height of a step formed in the stepped portion 30, and the height of a step is Δd/2. Since H/(n×m) substantively corresponds to a thickness of a chip, the height (Δd/2) of a step is not smaller than ½ of the thickness of a chip, and in the present embodiment the diameter difference ΔD is about twice the thickness of a chip, and, accordingly, the height (Δd/2) of a step has substantially the same dimension as the thickness of a chip.

$$\Delta d \geq H/(n \times m) \quad (1)$$

In the above-mentioned stepped portion 30, the flute bottom diameter is gradually and contiguously varied such that the shape of the flute bottom in a direction parallel to the tool axis O or along the spiral flute 20 shows a concaved curvature as shown in FIG. 1C. Consequently, chips that are produced by the cutting edge of the chamfer portion 22 and moved toward the shank 12 through the spiral flute 20, are smoothly directed outward and apart from the spiral flute 20 as shown with an arrow A which is not solid.

The great-diameter flute portion 20a disposed on the shank 12 side from the stepped portion 30 is a rough cut flute formed by cutting before quenched, and the small-diameter flute portion 20b disposed on the tap distal end side from the stepped portion 30 is a finishingly-ground flute formed by grinding after quenched. As shown in FIG. 2, the spiral fluted tap 10 according to the present embodiment is manufactured, first, by forming the rough cut flute having the flute bottom diameter d1 through cutting by a milling cutter over all the length of the spiral flute 20, on a tap material that is previously provided with such as the threaded portion 16 and has not been yet heat-treated (flute rough-cutting step). The bottom of the flute indicated by the dashed line in FIG. 1B shows the rough cut flute. Then, the tap material is hardened by quenching (heat treatment step), and, after the heat treatment step, only a portion of the rough cut flute on the tap distal end side from the stepped portion 30 is ground by a grindstone to have the flute bottom diameter d2 (flute grinding step). In the flute grinding step, the rough cut flute is finishingly ground to form the small-diameter flute portion 20h constituted of the finishingly-ground flute and to form the stepped portion 30 having the diameter difference Δd. The rough cut flute on the shank 12 side from the stepped portion 30 is used as the great-diameter flute portion 20a.

According to the spiral fluted tap 10 of the present embodiment, the flute bottom diameters d1 and d2 of the spiral flute 20 are different in the opposite portions with respect to the stepped portion 30, the stepped portion 30 disposed on the shank 12 side from the chamfer portion 22 of the threaded portion 16 being intervened between the opposite portions. The flute bottom diameter d2 on the distal end side of the tap from the stepped portion 30 is smaller than the flute bottom diameter d1 on the shank 12 side from the stepped portion 30, and, accordingly, chips produced by the cutting edge of the chamfer portion 22 move toward the shank 12 through the spiral flute 20 and reach the stepped portion 30 and, then, are directed toward the direction apart from the flute bottom by the stepped portion 30 and are outwardly from the spiral flute 20 and preferably discharged. This restrains troubles that a plurality of chips corresponding to the number n of the chamfer thread are mutually entangled in the same spiral flute 20 to be like a ball and it causes damages of the tool and the workpiece by clogging of chips or biting of chips or causes entangling, with such as the shank 12, of a part of the chips like a ball caught in the spiral flute 20 by extending from the spiral flute 20. Furthermore, thus, the performance of discharging chips is improved, and, accordingly, it is not necessary for workers to monitor entangling or clogging of chips even if a plurality of thread holes are contiguously made, to achieve full automation (labor-saving process).

In the present embodiment, the diameter difference Δd between the flute bottom diameters in the opposite portions with respect to the stepped portion 30 is determined to satisfy the formula (1), it is substantially greater than the thickness of a chip, and the height of a step formed in the stepped portion 30 is Δd/2, that is, a half of the diameter difference Δd and is not smaller than ½ of the thickness of a chip, and, accordingly, chips are properly directed toward the direction apart from the flute bottom by the stepped portion 30 and are outwardly from the spiral flute 20 and preferably discharged.

In the present embodiment, the small-diameter flute length La is not greater than a dimension (Ls+D) calculated by adding the outer diameter D of the threaded portion to the thread length Ls, and, accordingly, before a plurality of chips are mutually entangled in the spiral flute 20 to be like a ball, the chips are properly directed toward the direction apart from the flute bottom by the stepped portion 30 and are outwardly from the spiral flute 20 and preferably discharged, and, thus, mutual entangling of chips in the spiral flute 20 is preferably restrained.

In the present embodiment, the flute bottom diameter is gradually and contiguously varied such that the stepped portion 30 has a shape of a concaved curvature in the direction parallel to the tool axis O or along the spiral flute 20. And, accordingly, chips are properly directed toward the direction apart from the flute bottom along the stepped portion 30 and are outwardly from the spiral flute 20 and preferably discharged as shown with an arrow A which is not solid.

In the present embodiment, the great-diameter flute portion 20a disposed on the shank 12 side from the stepped portion 30 is a rough cut flute formed by cutting before quenched, and the small-diameter flute portion 20b disposed on the tap distal end side from the stepped portion 30 is a finishingly-ground flute formed by grinding after quenched. The rough cut flute is formed through cutting over all the length of the spiral flute 20, and only a portion of the rough cut flute on the tap distal end side from the stepped portion 30 is ground to have the finishingly-ground flute in the flute grinding step, and, accordingly, the spiral flute 20 constituted of the great-diameter flute portion 20a and the small-diameter flute portion 20b is formed. Consequently, it causes to reduce the cost for the flute grinding that requires remarkable labor and time, and, accordingly, to reduce the cost for manufacturing.

Results of the test for discharging performance of chips are shown in the table of FIG. 3 by cutting of the internal thread in the following cutting conditions with prepared seven test pieces of Nos. 1 to 7 that varies in the small-diameter flute length La, that is, the position of the stepped portion 30 and the diameter difference Δd. The test pieces Nos. 1 to 4 are according to the present invention that satisfies all the requirements in the first to fifth aspects, the test piece Nos. 5 and 6 are according to the present invention, however, they have the small-diameter flute lengths La which exceed Ls+1D, and the test piece No. 7 is the conventional product of which the flute is cut to have the flute bottom diameter d2 all over the spiral flute 20 by flute cutting. The workpiece material SCM440 shown in the Cutting Conditions is chromium-molybdenum steel defined in the JIS (Japanese Industrial Standards)

<<Cutting Conditions>>

Nominal Designation: M30×3.5
Workpiece Material: SCM440 (30HRC)
Machine Used: Vertical Type Machining Center
Cutting Speed: 7 m/min
Diameter of Prepared Hole: 26.5 mm in Diameter
Effective Length of Internal Thread: 50 mm
Cutting Fluid: Water-Soluble Cutting Oil (10 Times Diluted)

As apparent from results in the Results in FIG. 3, the test pieces Nos. 1 to 4 achieve superior performances in discharging chips without clogging of chips. The test piece No. 5 achieved less clogging of chips than the conventional test piece No. 7. The test piece No. 6 did not achieve any improved performance in discharging chips in the present cutting conditions because of producing substantially equal clogging of chips to the conventional test piece No. 7.

Figure 4A:
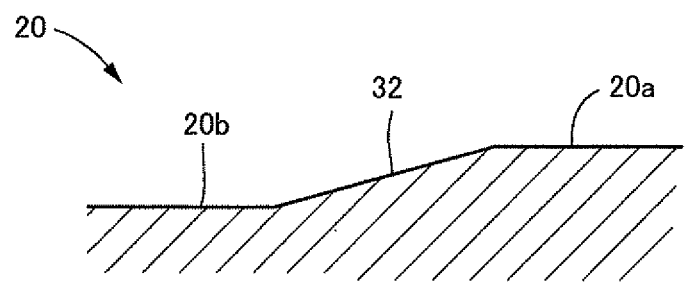
FIGS. 4A and 4B are diagrams for explaining another embodiment, and they are cross-sectional views corresponding to FIG. 1C.
Figure 4B:
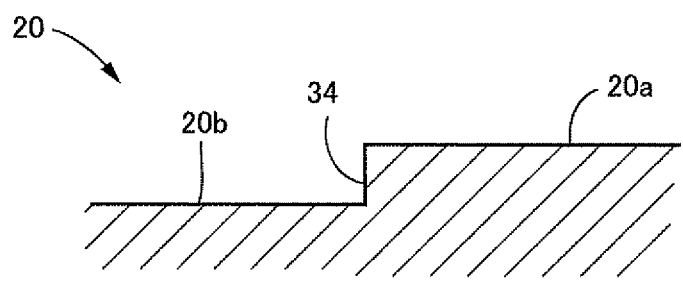

In the above embodiment, the stepped portion 30 of the concaved curvature is disposed, however, as shown in FIG. 4A, a stepped portion 32 having a tapered shape that linearly varies in the flute bottom diameter in a direction along the parallel direction to the tool axis O or the spiral flute 20 may be disposed, and, accordingly, the similar advantages can be obtained to the previous embodiment. As shown in FIG. 4B, a stepped portion 34 perpendicular to a direction (spiral direction) along the spiral flute 20 may be disposed. The stepped portion 34 may be disposed perpendicular to the tool axis O.

Hereinbefore, the embodiments according to the present invention are detailed based on the drawings. It is to be understood that the present invention may be embodied with other changes, improvements, and modifications that may occur to a person skilled in the art without departing from the scope and spirit of the invention defined in the appended claims.

The invention claimed is:

1. A spiral fluted tap which includes a threaded portion having an external thread corresponding to an internal thread to be cut and a cutting edge formed along a spiral flute formed to divide the external thread, and configured to be screwed into a prepared hole that is provided on a workpiece to cut an internal thread by the cutting edge on an inner circumferential surface of the prepared hole with discharging chips toward a shank via the spiral flute, wherein the spiral flute has a stepped portion at a rear end of a chamfer portion or in a portion on a shank side from the rear end of the chamfer portion in the threaded portion, a flute bottom diameter on a distal end side of the spiral fluted tap from the stepped portion is smaller than a flute bottom diameter on a shank side from the stepped portion, and a diameter difference Δd between the flute bottom diameters in opposite portions with respect to the stepped portion is determined to satisfy a following formula (1), $$\Delta d \geq H/(n \times m) \quad (1)$$

where H is a height of a thread of the internal thread to be tapped, n is a number of a chamfer thread of the threaded portion and m is a number of the spiral flute.

2. The spiral fluted tap of claim 1, wherein, in a parallel direction to a tool axis O, a small-diameter flute length La from a distal end of the spiral fluted tap to the stepped portion is not greater than a dimension calculated by adding an outer diameter D of the threaded portion to a thread length Ls from the distal end of the spiral fluted tap to a rear end of the threaded portion.

3. The spiral fluted tap of claim 1, wherein the flute bottom diameter is gradually and contiguously varied such that the stepped portion has a tapered shape or a concaved curvature shape in a direction parallel to a tool axis O or along the spiral flute.

4. The spiral fluted tap of claim 2, wherein the flute bottom diameter is gradually and contiguously varied such that the stepped portion has a tapered shape or a concaved curvature shape in a direction parallel to the tool axis O or along the spiral flute.

5. The spiral fluted tap of claim 1, wherein a great-diameter flute portion disposed on the shank side from the stepped portion is a rough cut flute formed by cutting before quenching, and a small-diameter flute portion disposed on the distal end side of the spiral fluted tap from the stepped portion is a finishingly-ground flute formed by grinding after quenching.

6. The spiral fluted tap of claim 2, wherein a great-diameter flute portion disposed on the shank side from the stepped portion is a rough cut flute formed by cutting before quenching, and a small-diameter flute portion disposed on the distal end side of the spiral fluted tap from the stepped portion is a finishingly-ground flute formed by grinding after quenching.

7. The spiral fluted tap of claim 3, wherein a great-diameter flute portion disposed on the shank side from the stepped portion is a rough cut flute formed by cutting before quenching, and a small-diameter flute portion disposed on the distal end side of the spiral fluted tap from the stepped portion is a finishingly-ground flute formed by grinding after quenching.

8. The spiral fluted tap of claim 4, wherein a great-diameter flute portion disposed on the shank side from the stepped portion is a rough cut flute formed by cutting before quenching, and a small-diameter flute portion disposed on the distal end side of the spiral fluted tap from the stepped portion is a finishingly-ground flute formed by grinding after quenching.

9. A method for manufacturing the spiral fluted tap of claim 5, comprising:

a flute rough-cutting step for forming the rough cut flute by cutting over all a length of the spiral flute;

a heat treatment step for hardening by quenching after the flute rough-cutting step; and a flute grinding step for forming the small-diameter flute portion constituted of the finishingly-ground flute which the rough cut flute is finishingly ground, by flute grinding the rough cut flute only on the distal end side of the spiral fluted tap from the stepped portion, after the heat treatment step.

* * * * *